United States Patent
Wang et al.

(10) Patent No.: US 11,532,125 B2
(45) Date of Patent: Dec. 20, 2022

(54) THREE-DIMENSIONAL MODEL-BASED COVERAGE PATH PLANNING METHOD FOR UNMANNED AERIAL VEHICLES

(71) Applicant: NANJING UNIVERSITY OF AERONAUTICS AND ASTRONAUTICS, Nanjing (CN)

(72) Inventors: Jun Wang, Nanjing (CN); Jiajia Dai, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/701,773

(22) Filed: Mar. 23, 2022

(65) Prior Publication Data
US 2022/0215621 A1    Jul. 7, 2022

(30) Foreign Application Priority Data
Sep. 24, 2021    (CN) .......................... 202111121543.5

(51) Int. Cl.
*G06T 17/05*      (2011.01)
*G06T 17/10*      (2006.01)
(Continued)

(52) U.S. Cl.
CPC ............ *G06T 17/05* (2013.01); *B64C 39/024* (2013.01); *G05D 1/101* (2013.01); *G06T 17/10* (2013.01);
(Continued)

(58) Field of Classification Search
None
See application file for complete search history.

(56) References Cited

U.S. PATENT DOCUMENTS

2016/0202695 A1    7/2016  Deroos et al.
2017/0039765 A1*   2/2017  Zhou ....................... G06T 7/521
(Continued)

FOREIGN PATENT DOCUMENTS

CN    106127853 A    11/2016
CN    111707269 A    9/2020
(Continued)

OTHER PUBLICATIONS

Shen et al., "3D Object Detection and Instance Segmentation from 3D Range and 2D Color Images", Sensors 2021, 21, 1213, Published: Feb. 9, 2021, https://doi.org/10.3390/s21041213 (Year: 2021).*
(Continued)

*Primary Examiner* — Tize Ma (57) ABSTRACT

A three-dimensional model-based coverage path planning method for an unmanned aerial vehicle, including determining a size of a view frustum of the unmanned aerial vehicle, and establishing a bounding box of the three-dimensional model; designing a three-dimensional grid map according to the view frustum and the bounding box, and defining an attribute of a grid, and arranging a measurement point of the unmanned aerial vehicle on a surface of the three-dimensional model; and planning an unmanned aerial vehicle measurement path on the surface of the three-dimensional model according to the arrangement of measurement points.

4 Claims, 7 Drawing Sheets

(51) Int. Cl.
*B64C 39/02* (2006.01)
*G05D 1/10* (2006.01)

(52) U.S. Cl.
CPC .... *B64C 2201/141* (2013.01); *G06T 2210/12* (2013.01)

(56) References Cited

U.S. PATENT DOCUMENTS

| | | | |
|---|---|---|---|
| 2018/0204343 A1* | 7/2018 | Galvane | B64C 39/024 |
| 2020/0027229 A1* | 1/2020 | Shen | G06V 20/10 |
| 2021/0209785 A1* | 7/2021 | Unnikrishnan | G01S 13/06 |
| 2022/0058823 A1* | 2/2022 | Malka | G06T 19/00 |

FOREIGN PATENT DOCUMENTS

| | | |
|---|---|---|
| CN | 112720468 A | 4/2021 |
| CN | 112802179 A | 5/2021 |
| CN | 113155054 A | 7/2021 |
| CN | 113284124 A | 8/2021 |

OTHER PUBLICATIONS

Ki Tae Kim, Geonwook Jeon; Mission Path Planning to Maximize Survivability for Multiple Unmanned Aerial Vehicles based on 3-dimensional Grid Map; IE Interfaces, vol. 25, No. 3, pp. 365-375, Sep. 2012; Naval War College, Joint Forces Military University.

Lu Xiang, Chen Zhuo, Huang Jiang-Bo, Liu Yan-Bo, Lin Yue-Guo; Naked Eye Inspection Around-Civil Aircraft Optimization Design in the Virtual Environment; Aircraft Design, vol. 37, No. 6, Dec. 2017; Aeronautical Engineering Institute, Civil Aviation University of China, Tianjin 300300, China.

* cited by examiner

THREE-DIMENSIONAL MODEL-BASED COVERAGE PATH PLANNING METHOD FOR UNMANNED AERIAL VEHICLES

CROSS-REFERENCE TO RELATED APPLICATIONS

This application claims the benefit of priority from Chinese Patent Application No. 202111121543.5, filed on Sep. 24, 2021. The content of the aforementioned application, including any intervening amendments thereto, is incorporated herein by reference in its entirety.

TECHNICAL FIELD

This application relates to unmanned aerial vehicles, and more specifically to a three-dimensional (3D) model-based coverage path planning method for an unmanned aerial vehicle.

BACKGROUND

In recent years, due to the excellent flexibility, light weight and low cost, unmanned aerial vehicles (UAVs) have been widely used in various fields. Especially, the application of the aircraft inspection on fuselage surface effectively reduces the cost via the unmanned aerial vehicle. Traditionally, the aircraft surface inspection requires staff to inspect the aircraft surface visually, or the combined use of a lift table and a crane to complete the surface inspection task. By comparison, the UAV-based aircraft surface inspection solution can not only reduce the labor intensity and cost, but also improve the inspection efficiency.

Most of the existing UAV path planning methods are carried out based on two-dimensional maps. However, for the aircraft surface inspection task, the application scenario is a three-dimensional space, and a flight height needs to be adjusted according to the requirements. At present, it is still difficult to develop a 3D map-based path planning strategy for unmanned aerial vehicles.

In the practical application, it is necessary to consider whether the flight path of the unmanned aerial vehicle fully covers the surface of the three-dimensional object, so as to prevent miss detection, and ensure a safe distance between the unmanned aerial vehicle and the surface of the three-dimensional object to ensure the inspection safety. However, it is impossible to determine whether the flight path of the unmanned aerial vehicle has achieved full coverage, by using the handheld remote control to operate the on-site flight of the unmanned aerial vehicle.

SUMMARY

In order to overcome the problems in the prior art, the present disclosure provides a three-dimensional (3D) model-based coverage path planning method for an unmanned aerial vehicle (UAV), which has a large detection coverage area, high efficiency, excellent robustness and low cost, and is not susceptible to the model structure.

The technical solutions of the present disclosure are described as follows.

This application provides a three-dimensional (3D) model-based coverage path planning method for an unmanned aerial vehicle (UAV), comprising:

(S1) determining a size of a view frustum of the unmanned aerial vehicle and establishing a bounding box of a three-dimensional model;

(S2) designing a three-dimensional grid map according to the view frustum and the bounding box, and arranging a measurement point of the unmanned aerial vehicle; and (S3) planning a measurement path of the unmanned aerial vehicle on a surface of the three-dimensional model.

In an embodiment, step (S1) is performed through the following steps:

(S11) defining the size of the view frustum of the unmanned aerial vehicle to ensure a working distance and a coverage area of the view frustum of the unmanned aerial vehicle to form a cube unit, and defining a side length of the cube unit as 1; where the view frustum is an attribute of a camera carried by the unmanned aerial vehicle;

(S12) calculating maximum values $x_{max}$, $y_{max}$ and $z_{max}$ of coordinates of points of the three-dimensional model on X-axis, Y-axis and Z-axis, respectively, and calculating minimum values of $x_{min}$, $y_{min}$ and $z_{min}$ of the coordinates of points of the three-dimensional model on X-axis, Y-axis and Z-axis, respectively; and designing a cubic bounding box with a side length of L, wherein the side length L satisfies the following conditions:

$$L = n \times l$$
$$L \geq \max((x_{max} - x_{min}), (y_{max} - y_{min}), (z_{max} - z_{min}));$$

wherein n is a positive integer, and max (·) is a function of taking a maximum value; and (S13) keeping the cubic bounding box stationary, and calculating a center point $c_{Box}$ of the cubic bounding box and a center point $c_{Model}$ of the three-dimensional model;

calculating a translation vector $\vec{d}$ as follows:

$$\vec{d} = c_{Box} - c_{Model};$$

and moving the three-dimensional model to the center point of the cubic bounding box according to the translation vector.

In an embodiment, step (S2) is performed through the following steps:

(S21) designing the three-dimensional grid map according to the view frustum and the bounding box;

dividing the cubic bounding box into n×n×n cube units according to the cube unit with a side length of l; and defining the n×n×n cube units as grids, and numbering individual grids as (i, j, k); wherein i represents the $i^{th}$ row; j represents the $j^{th}$ column; k represents the $k^{th}$ layer; and i, j and k are a positive integer, respectively, and 0≤i≤n, 0≤j≤n and 0≤k≤n;

(S22) defining an attribute of each of the grids; wherein the three-dimensional grid map comprises the three-dimensional model and a blank area, and a grid containing part of the three-dimensional model is defined as an obstacle, and a grid free of the three-dimensional model is defined as a blank point; and (S23) arranging the measurement point of the unmanned aerial vehicle according to a structure of the three-dimensional model, wherein among blank points, a grid containing the surface of the three-dimensional model is defined as the measurement point.

In an embodiment, step (S3) is performed using a Wave-Front algorithm through the following steps:

(S31) initializing relevant parameters, wherein the relevant parameters comprise an initial grid $(i, j, k)_{begin}$, the total number N of measurement points and a set of viewpoints;

(S32) setting a cost value cost $(i, j, k)_{begin}$ of the initial grid to 0, that is, cost $(i, j, k)_{begin}=0$;

calculating a cost value of individual grids in the three-dimensional grid map as follows:

$$\text{cost}(i, j, k) = \begin{cases} \min(\text{near}(i, j, k)) + 1, & \text{measurement points} \\ \text{nothing}, & \text{others} \end{cases};$$

wherein near $(i, j, k)$ represents grids near $(i, j, k)$; min $(\cdot)$ is a function of taking a minimum value; and taking the initial grid as a starting point and adding the initial grid to the set of viewpoints;

(S33) selecting an adjacent measurement point with the smallest cost value of a current measurement point as a moving target, and determining whether the adjacent measurement point with the smallest cost value is in the set of viewpoints;

if not, moving the unmanned aerial vehicle towards the adjacent measurement point with the smallest cost value;

otherwise, performing backtracking; and (S34) adding a current measurement point where the unmanned aerial vehicle is located to the set of viewpoints;

determining whether the total number of measurement points in the set of viewpoints is N;

if yes, indicating that all measurement points are covered, and ending a path planning task; and otherwise, returning to step (S33) to continue executing path planning.

For a locally optimal point of the unmanned aerial vehicle in a path planning process, that is, all adjacent measurement points of the current measurement point exist in the set of viewpoints, and a backtracking method is used to ensure that the path planning can cover all measurement points. The backtracking in step (S33) is performed through the following steps:

(S331) determining whether all adjacent measurement points of the current measurement point exist in the set of viewpoints;

if yes, returning to a previous measurement point of the current measurement point;

if not, further determining whether other adjacent measurement points are comprised in the set of viewpoints; if not, moving the unmanned aerial vehicle to the adjacent measurement point; and (S332) repeating step (S331) until there is an adjacent measurement point that is not included in the set of viewpoints among all adjacent measurement points of the current measurement point;

moving the unmanned aerial vehicle to the adjacent measurement point, and returning to step (S33) to continue executing the next step.

Compared to the prior art, the present disclosure has the following beneficial effects.

In the 3D model-based coverage path planning method provided herein for an unmanned aerial vehicle, a cube unit is designed according to the view frustum of a camera sensor carried by the unmanned aerial vehicle, and a cubic bounding box is built to design a three-dimensional grid map. An attribute of individual grids in the three-dimensional grid map is set according to a surface structure of the three-dimensional model to extract a measurement point of the unmanned aerial vehicle and ensure the safety of the unmanned aerial vehicle and the three-dimensional model during the path planning process. A WaveFront-based path planning algorithm and a backtracking mechanism are used to plan the coverage path on the surface of the three-dimensional model. Compared with the traditional path planning of the unmanned aerial vehicle in a two-dimensional space, the present disclosure achieves the path planning of the unmanned aerial vehicle in a three-dimensional space, and fully considers the safety of the unmanned aerial vehicle and the three-dimensional model. In addition, the method provided herein enables the full coverage detection of the surface of the three-dimensional object, and improves the detection efficiency and reduces the cost.

BRIEF DESCRIPTION OF THE DRAWINGS

In order to explain the technical solutions of the embodiments of the present disclosure more clearly, the drawings that need to be used in the embodiments will be briefly described below. It should be understood that presented in the drawings are only some embodiments of the present disclosure, which are not intended to limit the scope of the disclosure.

DETAILED DESCRIPTION OF EMBODIMENTS

The disclosure will be described completely and clearly below with reference to the accompanying drawings and embodiments to make the object, technical solutions, and beneficial effects of the present disclosure clearer.

Figure 1:
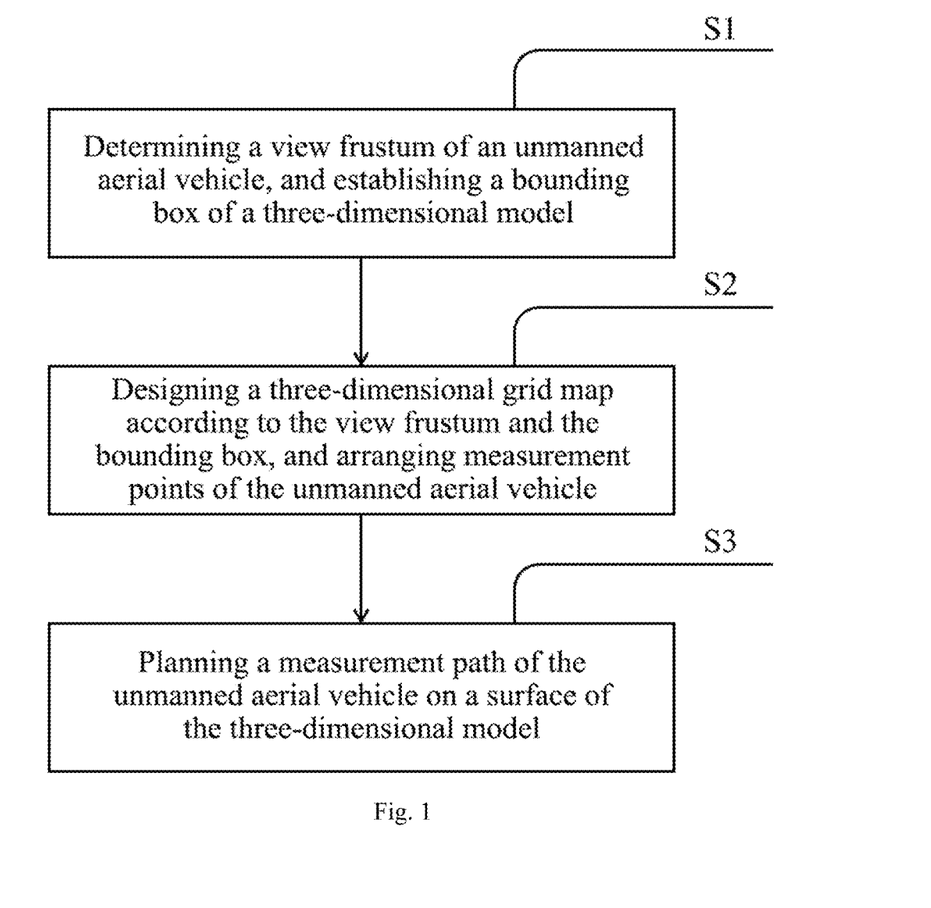
FIG. 1 is a flow chart of a three-dimensional model-based coverage path planning method for unmanned aerial vehicles according to an embodiment of the present disclosure.

As shown in FIG. 1, provided herein is a three-dimensional model-based coverage path planning method for an unmanned aerial vehicle (an application in the aircraft surface inspection is exemplarily described), which is performed through the following steps.

(S1) A size of a view frustum of the unmanned aerial vehicle is determined and a bounding box of a three-dimensional model is established.

(S2) A three-dimensional grid map is designed according to the view frustum and the bounding box and a measurement point of the unmanned aerial vehicle is arranged.

(S3) An unmanned aerial vehicle measurement path on a surface of the three-dimensional model is planned.

In an embodiment, step (S1) is performed through the following steps.

(S11) The size of the view frustum of the unmanned aerial vehicle is defined to ensure a working distance and a coverage area of the view frustum of the unmanned aerial vehicle to form a cube unit, and a side length of the cube unit is defined as 1.

(S12) Maximum values of $x_{max}$, $y_{max}$ and $z_{max}$ of coordinates of points of the three-dimensional model on X-axis, Y-axis and Z-axis are calculated respectively, and minimum values of $x_{min}$, $y_{min}$ and $z_{min}$ of the coordinates of points of the three-dimensional model on X-axis, Y-axis and Z-axis are calculated respectively; and a cubic bounding box with a side length of L is designed; where the side length L satisfies the following conditions:

$$L = n \times l$$
$$L \geq \max((x_{max} - x_{min}), (y_{max} - y_{min}), (z_{max} - z_{min}));$$

where n is a positive integer; and max (·) is a function of taking a maximum value. (S13) The cubic bounding box is kept stationary and a center point $c_{Box}$ of the cubic bounding box and a center point $c_{Model}$ of the three-dimensional model are calculated. A translation vector $\vec{d}$ is calculated as follows:

$$\vec{d} = c_{Box} - c_{Model}.$$

Figure 2:
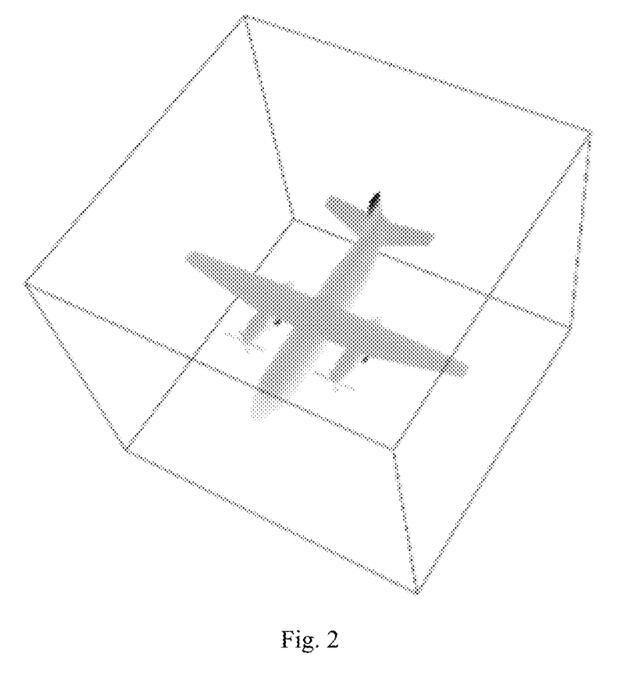
FIG. 2 schematically illustrates a cubic bounding box of an aircraft model according to an embodiment of the present disclosure.

The three-dimensional model is moved to the center point of the cube bounding box according to the translation vector. As shown in FIG. 2, an aircraft model is at the center point of the cubic bounding box.

In an embodiment, step (S2) is performed through the following steps.

Figure 3:
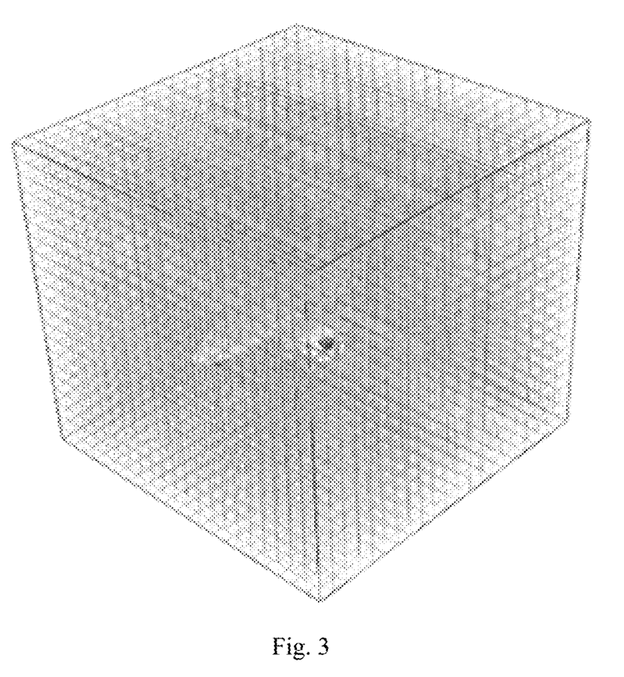
FIG. 3 schematically depicts a three-dimensional grid map of the aircraft model according to an embodiment of the present disclosure.

(S21) A three-dimensional grid map is designed according to the view frustum and the bounding box. The cubic bounding box is divided into n×n×n cube units according to the cube unit with a side length of 1. The n×n×n cube units are defined as grids. As shown in FIG. 3, the cubic bounding box is divided into grids. Individual grids are numbered as (i, j, k). Where i represents the $i^{th}$ row; j represents the $j^{th}$ column; k represents the $k^{th}$ layer; and i, j and k are positive integers, respectively, and 0≤i≤n, 0≤j≤n and 0≤k≤n.

Figure 4:
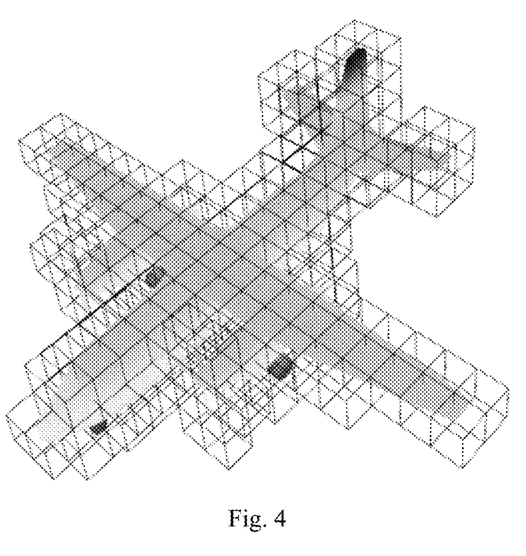
FIG. 4 is a schematic diagram of a grid including the aircraft model according to an embodiment of the present disclosure.

(S22) The three-dimensional grid map includes the three-dimensional model and a blank area. An attribute of each of the grids is defined. A grid containing part of the three-dimensional model is defined as an obstacle. As shown in FIG. 4, a grid containing the aircraft model is defined as an obstacle, and a grid free of the three-dimensional model is defined as a blank point.

Figure 5:
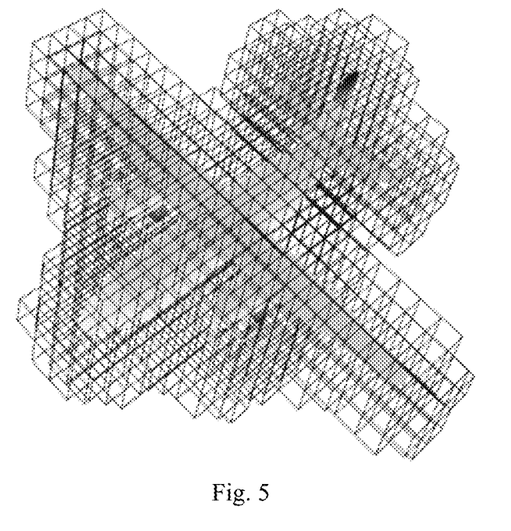
FIG. 5 is a schematic diagram of the grid where a UAV measurement point on a surface of the aircraft model is located according to an embodiment of the present disclosure.

(S23) The measurement point of the unmanned aerial vehicle is arranged according to a structure of the three-dimensional model, where among blank points, a grid containing the surface of the three-dimensional model is defined as the measurement point. As shown in FIG. 5, there is the measurement point on the surface of the aircraft model.

Figure 6:
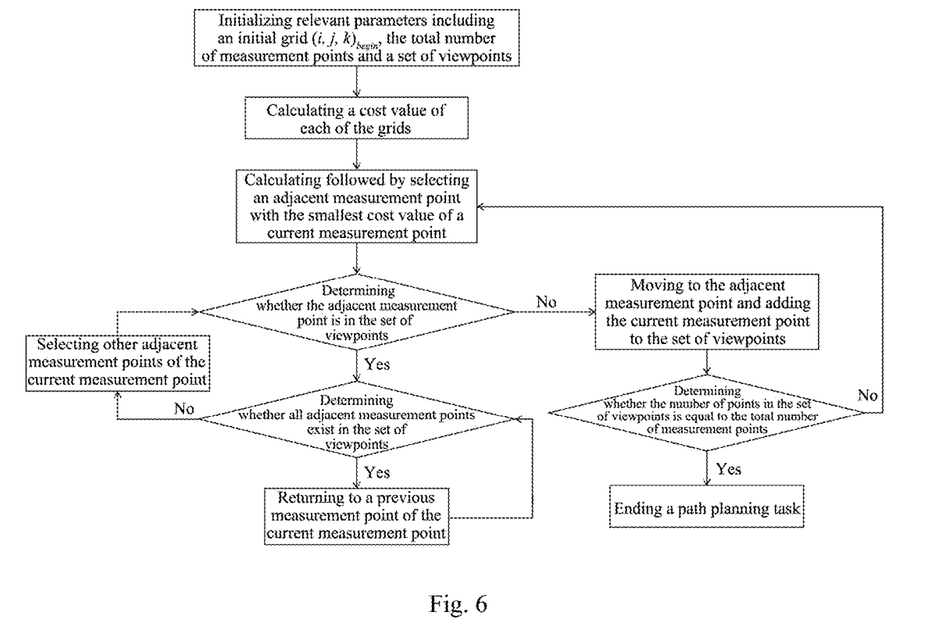
FIG. 6 is a flow chart of the path planning based on WaveFront algorithm according to an embodiment of the present disclosure.

In an embodiment, referring to FIG. 6, step (S3) is performed using a WaveFront algorithm through the following steps.

(S31) Relevant parameters are initialized. The relevant parameters include an initial grid (i, j, k)$_{begin}$, the total number N of measurement points and a set of viewpoints.

(S32) A cost value cost (i, j, k)$_{begin}$ of the initial grid is set to 0, that is, cost (i, j, k)$_{begin}$=0. The cost value of individual grids in the three-dimensional grid map is calculated as follows:

$$\text{cost}(i, j, k) = \begin{cases} \min(\text{near}(i, j, k)) + 1, & \text{measurement points} \\ \text{nothing}, & \text{others} \end{cases}.$$

Where near (i, j, k) represents grids near (i, j, k); min (·) is a function of taking a minimum value, and the initial grid is taken as a starting point and the initial grid is added to the set of viewpoints.

(S33) An adjacent measurement point with the smallest cost value of a current measurement point is selected as a moving target, and it is required to determine whether the adjacent measurement point with the smallest cost value is in or not in the set of viewpoints.

If not, the unmanned aerial vehicle is moved towards the adjacent measurement point with the smallest cost value; otherwise, backtracking is performed.

(S34) A current measurement point where the unmanned aerial vehicle is located is added to the set of viewpoints. It is required to determine whether the total number of measurement points in the set of viewpoints is N.

If yes, indicate that all the measurement points are covered and a path planning task is ended; otherwise, it is required to return to step (S33) to continue executing path planning.

For a locally optimal point of the unmanned aerial vehicle in a path planning process, that is, all adjacent measurement points of the current measurement point exist in the set of viewpoints, and a backtracking method is used to ensure that the path planning can cover all measurement points. The backtracking in step (S33) is performed through the following steps.

(S331) It is required to determine whether all adjacent measurement points of the current measurement point exist in the set of viewpoints.

If yes, it is required to return to a previous measurement point of the current measurement point.

If not, it is required to further determine whether other adjacent measurement points are included in the set of viewpoints. If not, the unmanned aerial vehicle is moved to the adjacent measurement point.

(S332) Step (S331) is repeated until there is an adjacent measurement point that is not included in the set of viewpoints among all adjacent measurement points of the current measurement point. The unmanned aerial vehicle is moved to the adjacent measurement point, and it is required to return to step (S33) to continue executing the next step.

Figure 7:
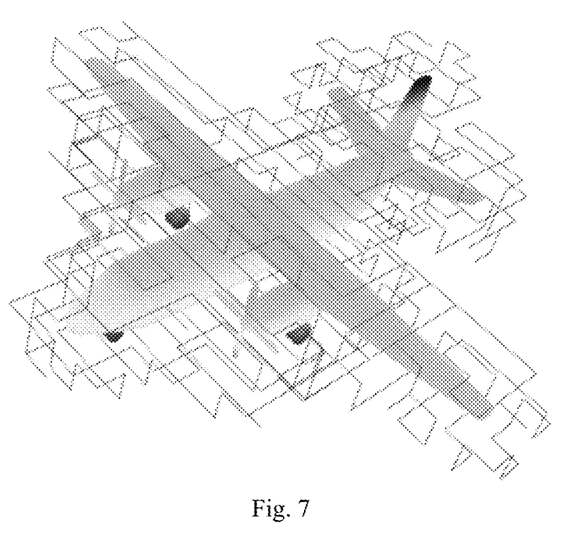
FIG. 7 schematically shows a measurement path planning on the surface of the aircraft model according to an embodiment of the present disclosure.

FIG. 7 is a schematic diagram of a measurement path planning on the surface of the aircraft model according to an embodiment of the present disclosure. It should be noted that as used herein, the terms such as "up", "down", "left", "right", "front", "back", etc. are only for the convenience of description, and are not intended to limit the present disclosure. It should be understood that any changes or adjustments in the relative relationship without changing the substantial technical solution should fall within the scope of the present disclosure.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A three-dimensional (3D) model-based coverage path planning method for an unmanned aerial vehicle, comprising:

(S1) determining a size of a view frustum of the unmanned aerial vehicle and establishing a bounding box of a three-dimensional model;

(S2) designing a three-dimensional grid map according to the view frustum and the bounding box; and arranging a measurement point of the unmanned aerial vehicle; and (S3) planning a measurement path of the unmanned aerial vehicle on a surface of the three-dimensional model;

wherein step (S1) is performed through the following steps:

(S11) defining the size of the view frustum of the unmanned aerial vehicle to ensure a working distance and a coverage area of the view frustum of the unmanned aerial vehicle to form a cube unit, and defining a side length of the cube unit as l;

(S12) calculating maximum values $x_{max}$, $y_{max}$ and $z_{max}$, of coordinates of points of the three-dimensional model on X-axis, Y-axis and Z-axis, respectively, and calculating minimum values $x_{min}$, $y_{min}$, and $z_{min}$ of the coordinates of points of the three-dimensional model on X-axis, Y-axis and Z-axis, respectively; and designing a cubic bounding box with a side length of L, wherein the side length L satisfies the following conditions:

$$L = n \times l$$

$$L \geq \max((x_{max} - x_{min}), (y_{max} - y_{min}), (z_{max} - z_{min}));$$

wherein n is a positive integer; and max (·) is a function of taking a maximum value; and (S13) keeping the cubic bounding box stationary, and calculating a center point $c_{Box}$ of the cubic bounding box and a center point $c_{Model}$ of the three-dimensional model;

calculating a translation vector $\vec{d}$ as follows:

$$\vec{d} = c_{Box} - c_{Model};$$ and moving the three-dimensional model to the center point of the cubic bounding box according to the translation vector;

wherein step (S2) is performed through the following steps:

(S21) designing the three-dimensional grid map according to the view frustum and the bounding box; dividing the cubic bounding box into n×n×n cube units according to the cube unit with a side length of l; and defining the n×n×n cube units as grids, and numbering individual grids as (i, j, k); wherein i represents the $i^{th}$ row; j represents the $j^{th}$ column; k represents the $k^{th}$ layer; and i, j and k are a positive integer, respectively, and 0≤i≤n, 0≤j≤n and 0≤k≤n;

(S22) defining an attribute of each of the grids; wherein the three-dimensional grid map comprises the three-dimensional model and a blank area; and a grid containing part of the three-dimensional model is defined as an obstacle, and a grid free of the three-dimensional model is defined as a blank point; and (S23) arranging the measurement point of the unmanned aerial vehicle according to a structure of the three-dimensional model, wherein among blank points, a grid containing the surface of the three-dimensional model is defined as the measurement point.

2. The 3D model-based coverage path planning method of claim 1, wherein step (S3) is performed using a WaveFront algorithm through the following steps:

(S31) initializing relevant parameters, wherein the relevant parameters comprise an initial grid (i, j, k)$_{begin}$, the total number N of measurement points and a set of viewpoints;

(S32) setting a cost value cost (i, j, k)$_{begin}$ of the initial grid to 0;

calculating a cost value of individual grids in the three-dimensional grid map as follows:

$$\text{cost}(i, j, k) = \begin{cases} \min(\text{near}(i, j, k)) + 1, & \text{measurement points} \\ \text{nothing}, & \text{others} \end{cases};$$

wherein near (i,j,k) represents grids near (i,j,k); min (·) is a function of taking a minimum value; and taking the initial grid as a starting point and adding the initial grid to the set of viewpoints;

(S33) selecting an adjacent measurement point with the smallest cost value of a current measurement point as a moving target, and determining whether the adjacent measurement point with the smallest cost value is in the set of viewpoints;

if not, moving the unmanned aerial vehicle towards the adjacent measurement point with the smallest cost value;

otherwise, performing backtracking; and (S34) adding the current measurement point where the unmanned aerial vehicle is located to the set of viewpoints;

determining whether the total number of measurement points in the set of viewpoints is N;

if yes, indicating that all measurement points are covered, and ending a path planning task; and otherwise, returning to step (S33) to continue executing path planning.

3. The 3D model-based coverage path planning method of claim 2, wherein the backtracking in step (S33) is performed through the following steps:

(S331) determining whether all adjacent measurement points of the current measurement point exist in the set of viewpoints;

if yes, returning to a previous measurement point of the current measurement point;

if not, further determining whether other adjacent measurement points are comprised in the set of viewpoints; if not, moving the unmanned aerial vehicle to the adjacent measurement point; and (S332) repeating step (S331) until there is an adjacent measurement point that is not comprised in the set of viewpoints among all adjacent measurement points of the current measurement point;

moving the unmanned aerial vehicle to the adjacent measurement point, and returning to step (S33) to continue executing the next step.

4. The 3D model-based coverage path planning method of claim 1, wherein the three-dimensional model is a three-dimensional digital model of a real object.

* * * * *